United States Patent [19]

Stich

[11] 4,363,060

[45] Dec. 7, 1982

[54] ARCLESS TAP CHANGER FOR VOLTAGE REGULATOR

[75] Inventor: Frederick A. Stich, Milwaukee, Wis.

[73] Assignee: Siemens-Allis, Inc., Atlanta, Ga.

[21] Appl. No.: 332,365

[22] Filed: Dec. 18, 1981

Related U.S. Application Data

[63] Continuation of Ser. No. 105,081, Dec. 19, 1979, abandoned.

[51] Int. Cl.[3] .............................. H02H 7/20

[52] U.S. Cl. .............................. 361/8; 323/343; 323/262; 361/13

[58] Field of Search .............................. 361/8, 13, 9, 5, 6, 361/3, 2; 323/343, 344, 262; 307/134, 135, 137

[56] References Cited

U.S. PATENT DOCUMENTS

| | | | |
|---|---|---|---|
| 3,515,980 | 6/1970 | Throop | 323/343 |
| 3,621,374 | 11/1971 | Kettler | 323/343 |
| 3,621,375 | 11/1971 | Kettler | 323/262 |
| 3,786,337 | 1/1974 | Kugler | 361/8 X |
| 4,130,789 | 12/1978 | Neumann | 323/343 |
| 4,201,938 | 5/1980 | Neumann | 361/13 X |

*Primary Examiner*—Patrick R. Salce
*Attorney, Agent, or Firm*—Frederick W. Powers, III

[57] ABSTRACT

A tap changer voltage regulator permits a tap changer selector contact to engage an open circuited new tap without arcing and has a half-tap voltage auxiliary winding which permits halving the inter-tap voltage to thus double the number of steps, and an auxiliary switch with a pair of movable contacts. A first auxiliary contact initially connects a selector contact which has moved to a new tap through a circulating current limiting resistor to a load, preventing load current interruption. A second auxiliary contact is in series with a normally-closed switch through which load current and circulating current flow. A first set of inverse parallel SCR's is in series with the resistor, while the normally-closed switch is shunted by a second pair of inverse parallel thyristors. The first pair of thyristors is not gated until the first auxiliary contact has attained its new position, precluding initial arcing. The normally-closed switch is then opened to transfer the current to the thyristors, and gating current is subsequently removed from the second pair of thyristors so that load and circulating current are statically interrupted by the thyristors at current zero, thus completing the tap change by permitting the second auxiliary contact to arclessly interrupt the circuit to the selector contact on the previous tap.

6 Claims, 6 Drawing Figures

ARCLESS TAP CHANGER FOR VOLTAGE REGULATOR

This is a continuation of application Ser. No. 105,081, filed Dec. 19, 1979, now abandoned.

BACKGROUND OF THE INVENTION

This invention relates to voltage control systems of the tap changing type, and more particularly to an improved circuit for preventing arcing as taps are changed.

A step voltage regulator is an autotransformer provided with load ratio control equipment for regulating the voltage on the feeder or bus to which it is connected. A typical step voltage regulator may have a 100 percent exciting winding in shunt with the line on the source side and normally maintains the voltage on the load side within a desired voltage bandwidth by means of a 10 percent tapped buck/boost winding connected in series with the line. The series winding has taps connected to the stationary contacts of a tap changer dial switch. The switch is provided with a pair of rotatable selector contacts driven by a reversible motor into sequential engagement with the stationary contacts. This switch usually provides the ability to change the effective turns ratio from input to output plus or minus 10 percent in 32 steps of $\frac{5}{8}$ percent each. The rotatable contacts of the tap changer switch are usually connected through slip rings to the opposite sides of a bridging center-tapped autotransformer reactor, termed a preventive autotransformer, to permit transition from one tap position to another without interrupting the load current. When the selector contacts bridge adjacent stationary contacts, the high reactance of the preventive autotransformer limits circulating current to a safe value and reduces burning and erosion of the tap changer contacts. It also provides a voltage midway between that of the taps to thereby provide twice the number of steps.

Such a preventive autotransformer, however, has continuous energy losses in operation and is bulky and expensive to construct, U.S. Pat. No. 4,130,789 discloses a tap changing voltage regulator which eliminates such a preventive autotransformer and also prevents arcing at the tap changer selector contacts by providing a half-tap voltage auxiliary winding and an auxiliary switch which permits a selector contact to step arclessly to an open circuited new tap. The regulator then connects the selector contact in series with the auxiliary winding, a current-limiting inductor and the load at reduced voltage to effect a tap change without interruption of the load circuit.

Later-filed patent application Ser. No. 947,871, filed Oct. 2, 1978, now U.S. Pat No. 4,201,938 teaches a voltage regulation system which allows for substantially arcless tap changing without utilizing a preventive autotransformer. While the inventions set forth in the foregoing patent and patent application provide greatly improved results over previously known voltage regulators, it has been found that some arcing still occurs under operating conditions.

It is therefore an object of this invention to provide an improved tap changer voltage regulator which eliminates arcing at the auxiliary contacts thereof and also arclessly interrupts the current which circulates when the selector contacts are on adjacent taps during a tap change.

BRIEF DESCRIPTION OF THE DRAWINGS

While the specification concludes with claims particularly pointing out and distinctly claiming the subject matter which is regarded as an invention, it is believed that the invention will be better understood from the following description of preferred embodiment taken in conjunction with the accompanying drawings in which:

SUMMARY OF THE INVENTION

A tap changer voltage regulator including an auxiliary switch system with a first movable contact which couples the selector contact on the new tap through a current limiting resistor and a first pair of thyristors to an outgoing load-current-carrying line. The thyristors are gated on after the new tap is contacted to prevent arcing. A second movable contact is in series with a normally closed switch through which flow the load current and circulating current. The normally closed switch is shunted by a second pair of oppositely-poled thyristors.

The auxiliary switch system opens the normally closed switch to transfer the current to the second pair of thyristors and subsequently removes gating current from them so that load and circulating currents are statically interrupted at a current zero, thereby permitting the second movable contact to arclessly interrupt the circuit to the selector contact on the previous tap and complete the tap change.

DETAILED DESCRIPTION OF THE INVENTION

Figure 1:
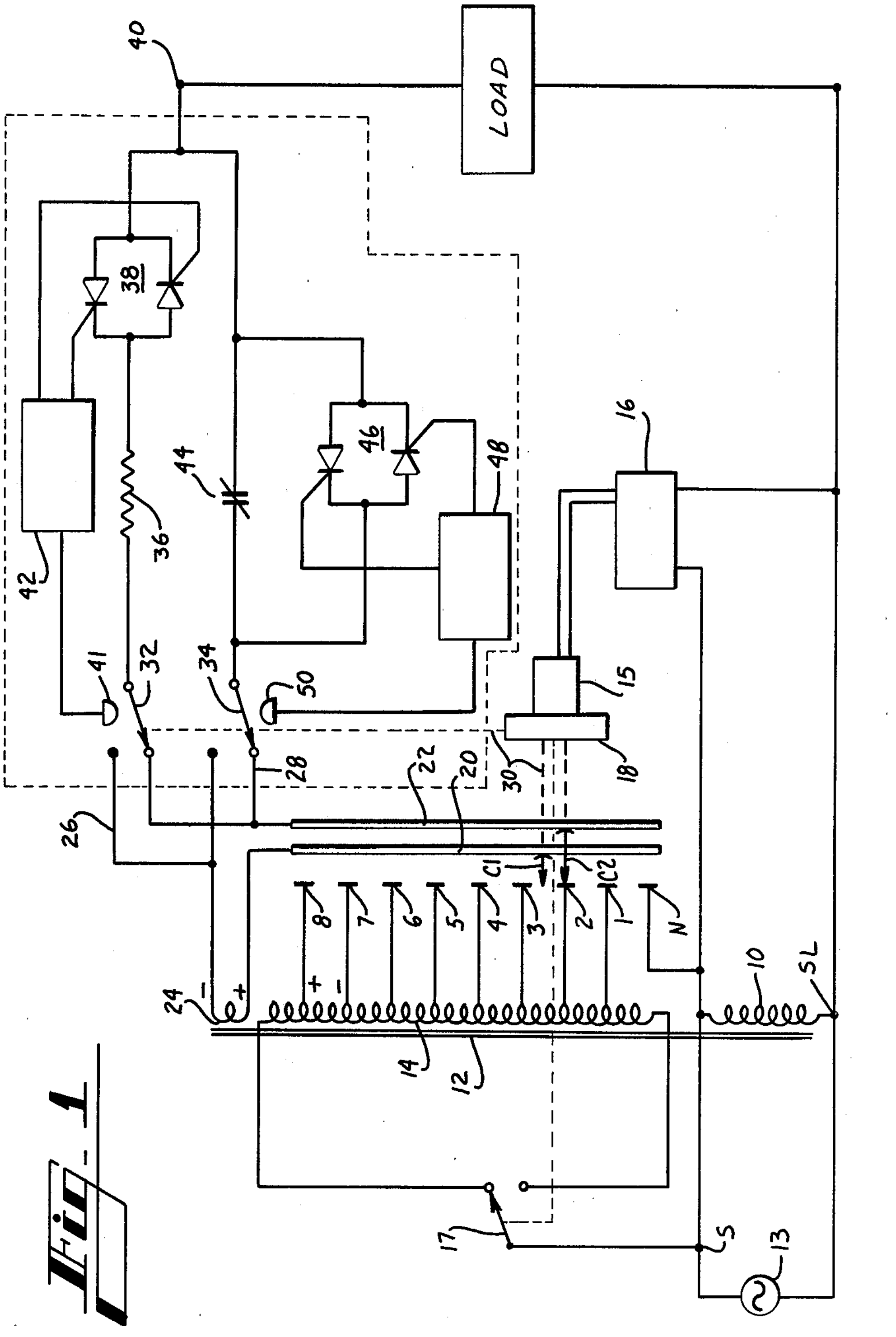
FIG. 1 is a schematic diagram of an improved arcless tap changer constructed in accordance with the present invention.

A step voltage regulator embodying the invention illustrated in FIG. 1 has a 100 percent exciting winding 10 which inductively links a magnetic core 12 and is connected across the regulator S and SL bushings which in turn are adapted to be connected to an alternating current source 13 such as a power line. The regulator also has a 10 percent series winding 14 inductively linking magnetic core 12 and is connected in series with a power line and is provided with a plurality of taps 1–8 which comprise the stationary contacts of a tap changer dial switch. The contacts are preferably arranged in a circle and selectively engaged by a pair of movable selector contacts C1 and C2. Contacts C1 and C2 are driven to the desired position by a motor 15 and drive mechanism 18, controlled by a conventional motor control 16.

One side of shunt winding 10 is connected to a stationary neutral contact N and is also connected to the ends of series winding 14 by an automatic, mechanically operated reversing switch 17 which reverses the polarity of series winding 14 so that it may be connected in bucking or boosting relation with shunt winding 10, thereby doubling the range of the tap changer.

The two movable selector contacts C1 and C2 engage the stationary contacts 1–8 and N. Only one movable selector contact C2 is in engagement with a stationary contact in the quiescent state of the tap changer switch illustrated in FIG. 1, and selector contacts C1 and C2 are in bridging relation with adjacent stationary contacts or on the same stationary contact only during a tap change. Selector contacts C1 and C2 slidably engage conductive collectors 20 and 22 respectively which preferably are slip rings located concentrically with the circle of taps 1-8 and N.

A half-tap voltage auxiliary winding 24 inductively linking magnetic core 12 has approximately one-half as many turns as the number of turns between adjacent taps of series winding 14 so that the auxiliary winding produces a full step, (or half-tap), voltage. Preferably, auxiliary winding 24 is wound to oppose the voltage of series winding 14 but in an alternative embodiments auxiliary winding 24 may be in aiding relation to winding 14. One side of the auxiliary winding is connected to slip ring 20, and the other side is connected to the second terminal 26 of an auxiliary system which is generally delineated in the Figure by a broken line. First terminal 28 of the auxiliary system is connected to slip ring 22. In the illustrated embodiment terminals 26 and 28 are split to form pairs of terminals which are engaged by first and second movable contacts 32 and 34. The auxiliary switch system is preferably operated synchronously with tap changer switch selector contacts C1 and C2 by a common drive mechanism, as indicated.

Movable contacts 32 and 34 normally engage the same stationary terminal 26 or 28 and are adapted to step between stationary terminals 26 and 28 so that the first movable contact 32 always disengages one stationary terminal and engages the other before the second movable contact 34 leaves the one stationary terminal. As is conventional in tap changer mechanisms of the general type illustrated a cam-and-follower, or alternatively a scotch yoke, drive mechanism is provided and is coupled to movable contacts 32 and 34 to cause them to operate in the proper sequence relative to main contact C1 and C2. Inasmuch as such an arrangement is well known in the art it is not shown in detail, but is schematically represented at 30.

The first movable contact 32 is connected through an impedance such as resistor 36 and a pair of inverse parallel SCR's 38 when movable contact 32 reaches a closed position. A microswitch 41 disposed adjacent contact 32 serves to energize an SCR trigger circuit 42. The second movable contact 34 is connected to output terminal 40 through a normally closed current switch 44 operated in a conventional manner by the drive mechanism. A pair of SCR's 46 connected in inverse parallel are connected between second movable contact 34 and terminal 40 and are in shunt with switch 44 so that load current flows from tap 2 through selector contact C2, and through movable contact 34 and switch 44. A second gating circuit 48 regulates the gating of SCR's 46 and receives inputs from a microswitch 50 disposed in close proximity to, and operated by movable contact 34 or by drive mechanism 50.

Gating circuits 42 and 48 may be of any appropriate type, it being recognized by those skilled in the art that a broad range of thyristor gating circuits are available in standard reference books. For example, the SCR Manual, Fifth Edition, published by the General Electric Company, teaches a number of applicable circuits. Further, the above-referenced U.S. Pat. No. 4,139,789 and co-pending U.S. patent application No. 947,871, which are incorporated herein by reference, teach additional, specific gating circuits along with a cam and follower system which may be used with the present invention. It will be recognized that gating circuits 42 and 48 may be energized in response to signals from current transformers, voltages sensed upon the various conductors, or mechanical transducers such as microswitches. Election of appropriate sensing means is not considered germane to the present invention and will vary in accordance with the application of a given design and the preference of the circuit designer.

FIG. 1 shows the state of the elements before and after a tap change. Selector contact C2 is on tap 2, selector contact C1 is between taps 2 and 3 auxiliary contacts 32 and 34 engage terminal 28. The circuit to the load extends through from bushing S, reversing switch 17, a portion of winding 14, tap 2, selector contact C2, slip ring 22, auxiliary system terminal 28, movable contact 34, switch 44 and output terminal 40. Main selector contact C1 is free to move to a new tap in the "raise" direction without arcing since terminals 26 are open circuited.

Figure 3:
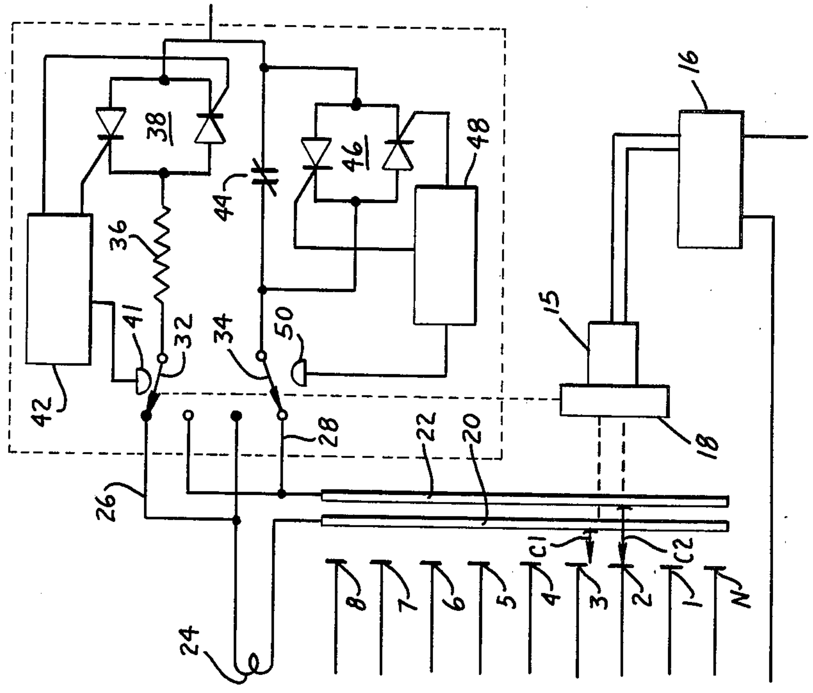
FIGS. 2–5 illustrate the progressive positions of the system shown in FIG. 1 during operation thereof.
Figure 2:
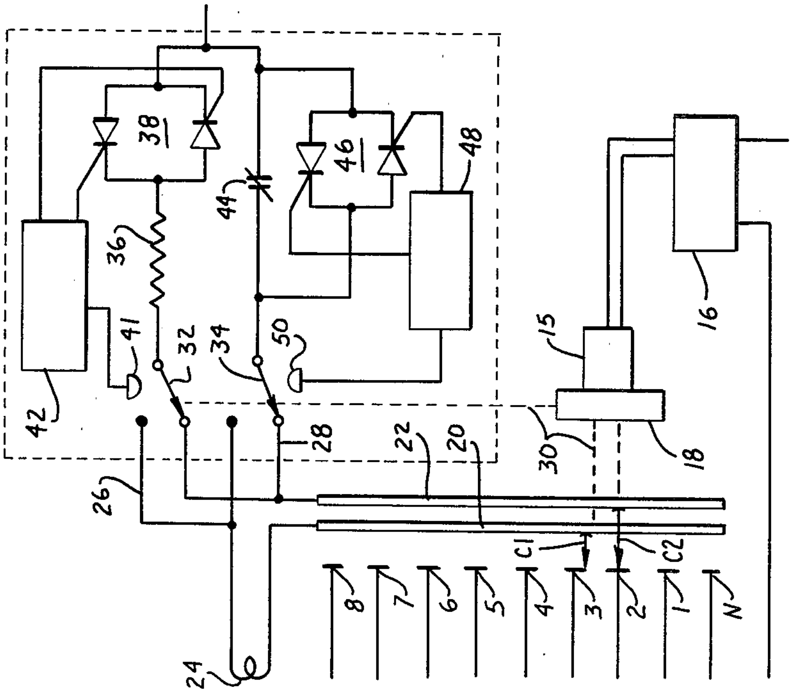

In FIG. 2 selector contact C1 has been moved arclessly into engagement with tap 3 while selector contact C2 remains on tap 2. Operation of the auxiliary system to effectuate the tap change is initiated by drive 18, which displaces movable contact 32 from terminal 28 and causes it to engage terminal 26 as shown in FIG. 3. Movable contact 34 remains in engagement with stationary contact 28, forming a circuit to the load which extends from tap 2 through switch 44. The position of contact 32 is sensed by gating circuit 42 through microswitch 41 or similar transducer, so that no gating current is applied to SCR's 38 until movable contact 32 has engaged contact 26. A short time delay is advantageously incorporated into the gating circuit 42 to allow contact bounce, if any, to cease. After the time delay interval has expired, gating current is supplied to the gates of SCR's 38 in order to complete a circuit extending through selector contact C1, auxiliary winding 24, current limiting resistor 36, SCR's 38, and the load.

At this instant the current to the load is still being maintained through main selector contact C2, slip ring 22, movable contact 34, and switch 44. Thyristors 46 are shorted by switch 44.

As SCR's 38 are gated on, circulating current starts to flow in a circuit traced from tap 3, selector contact C1, collector 20, auxiliary winding 24, terminal 26, movable contact 32, resistor 36, SCR's 38, switch 44, movable contact 34, terminal 28, collector 22, selector contact C2 and tap 2. The magnitude of the current is limited by resistor 36.

Figure 4:
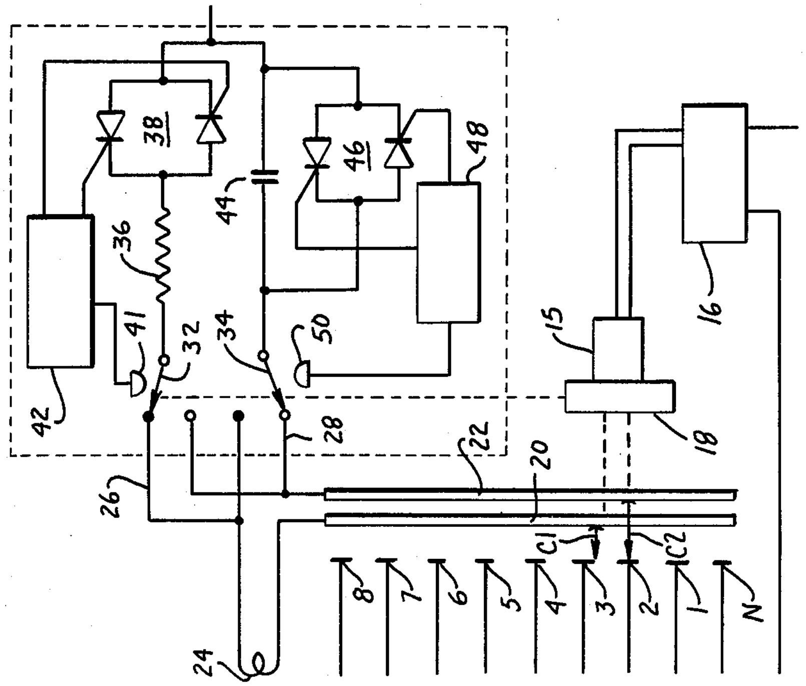

Microswitch 50 provides an input signal to gating control circuit 48 so that gating current is supplied to SCR's 46 at the proper time. Switch 44 now opens, as illustrated in FIG. 4, to transfer current from its contacts to SCR's 46. The latter receive gating current from gating circuit 48 and begin to conduct as soon as the short circuit is removed. Because it is shunted by SCR's 46, the opening of switch 44 is essentially arcless. After switch 44 opens, as detected by microswitch 50, and after a predetermined time delay control circuit 48 discontinues gating current to SCR's 46. Since gating current is no longer being applied to SCR's 46 they turn off at a load current zero, and thus statically interrupt the load and circulating current flowing through selector contact C2. Load current now flows through selector contact C1, collector 20, auxiliary winding 24, terminal 26, movable contact 32, resistor 36 and SCR's 38 to the load. Auxiliary switch contact 34 is now free to move arclessly from terminal 28 to terminal 26 as the drive system 18 is advanced by motor 15.

Figure 5:
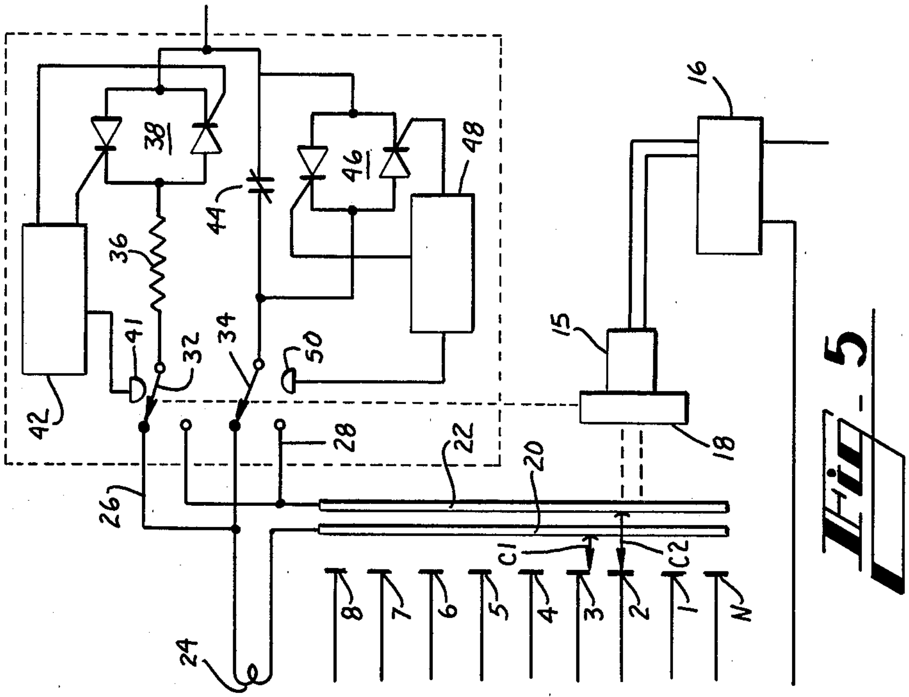

SCR's 46 are now gated on in response to the movement of contact 34, immediately after which switch 44 closes, as illustrated in FIG. 5, to shunt the load current from resistor 36. First main selector contact C1 is now carrying the load current, and second selector contact C2 is arclessly disengaged from tap 2 as no current is flowing through it. Drive 18 then moves contact C2 to a position between taps 2 and 3 as illustrated in FIG. 5 to complete the tap change.

For successive tap changes the foregoing procedure is repeated, realizing of course that the movements of main selector contacts C1 and C2 alternate, depending upon whether an increase or decrease in output voltage is sought. Regardless of the direction of change the auxiliary system continues to function in the same manner described. SCR's 38 are rendered non-conductive by the absence of a gate signal from control 42, and first auxiliary contact 32 contact is moved from one slip ring terminal to the next. SCR's 38 are then gated on, and current begins to flow through resistor 36 and contact 32. With load current thus established, switch 44 opens and SCR's 46 are disabled, whereupon second movable contact 34 is moved to make electrical connection with the newly-moved selector contact C1 or C2. SCR's 46 are gated on, and switch 44 then closes. Finally, SCR's 38 are gated off so that the totality of load current flows through second auxiliary contact 34 and switch 44.

Figure 6:
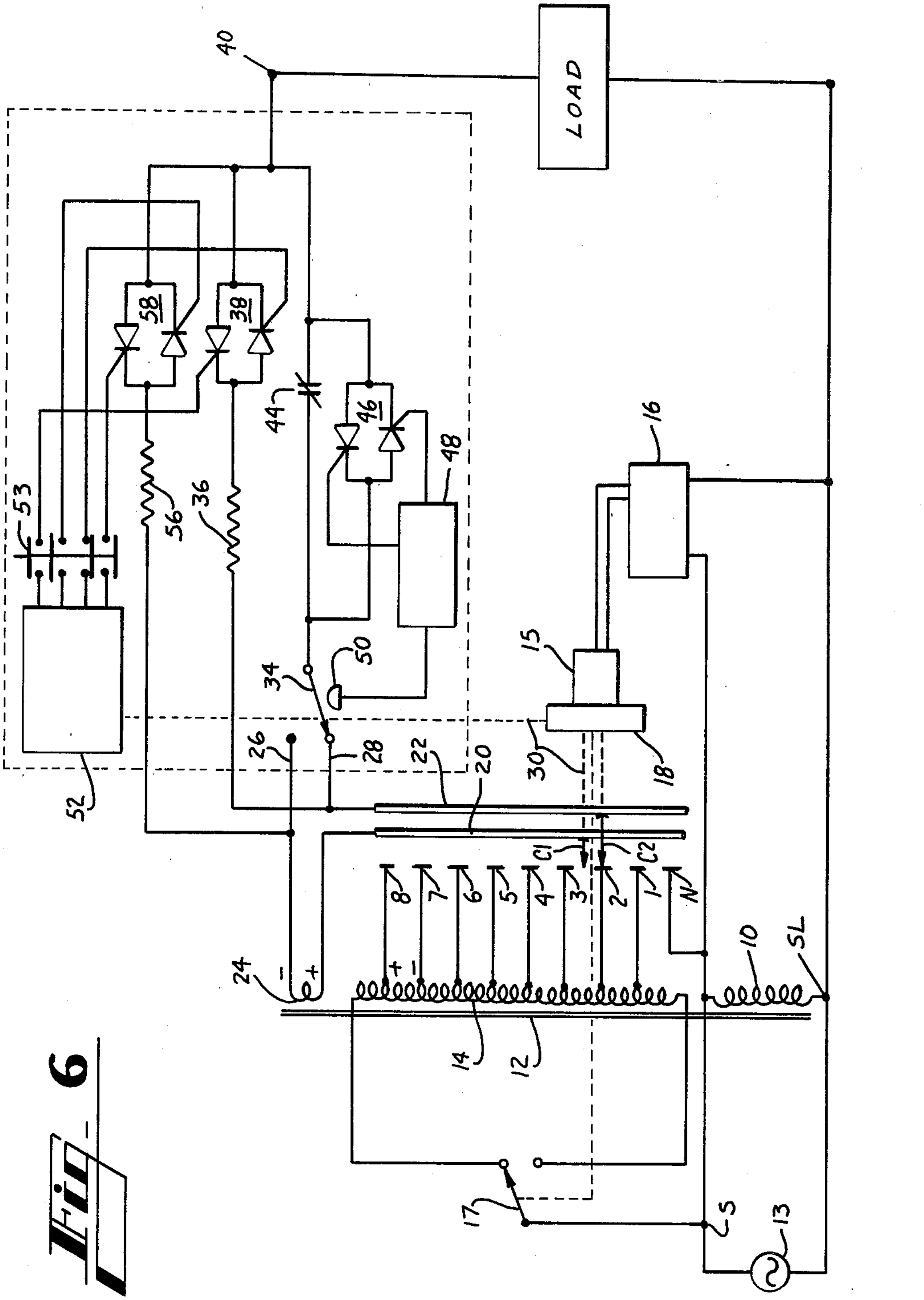
FIG. 6 illustrates an alternate embodiment of the present invention.

In FIG. 6 there is shown an alternate embodiment of the invention described above, wherein the auxiliary switching unit comprising movable contactor 32 has been eliminated and a third set of inverse parallel SCR's are provided. In particular, SCR's 38 and associated current limiting resistor 36 are now connected directly to collector ring 22. Collector 20 is coupled in like manner to a second current limiting resistor 56 and thence to a third pair of inverse parallel SCR's 58. A control 52, which may be identical to control 42 described above, is actuated by drive mechanism 18 by means of a microswitch on the like. A selector switch 53 is provided. In a first position switch 53 allows gating signals to be coupled with SCR's 38 while in a second position the gating signals are applied to SCR's 58.

In a tap change mode commencing from the position shown in FIG. 6, contactor C1 is moved upwardly to tap 3. Newly-energized collector ring 20 is coupled to the load by virtue of gating signals from control 52 being applied to SCR's 58. SCR's 46 are then energized, and switch 44 opens arclessly as the SCR's 46 provide an alternative current path. SCR's 46 are then disabled and switch 34 is moved to contact 26, as described hereinabove. Switch 44 is then closed, whereupon load current from selector C1 flows through a circuit extending through auxiliary winding 24, movable contact 34, switch 44 and output terminal 40. After movable contact 34 achieves its new position, and after a short time delay which may be provided to allow for contact bounce to cease, control 52 disables SCR's 58 so that load current only flows through the last-described path.

When it is desired to move contactor C2 to a new tap position, the above procedure is followed with the exception that SCR's 38, rather than 58, are energized to temporarily carry current from the newly-positioned contactor, while switch 34 moves arclessly from contact 26 to 28. After switch 34 attains its new position, switch 44 is closed and load current from contactor C2 flows through slip ring 22, movable contact 34 and switch 44 to the load.

It will now be appreciated that the present invention provides improved means for arclessly making and breaking circuits in a voltage regulator of the tap changing type. As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent Of The United States is:

1. In a power line voltage regulator of the tap changing type including a main winding and a tapped auxiliary winding, a plurality of taps on said auxiliary winding, a pair of selector contacts for engaging the taps, a collector coupled to each selector contact, drive means for operating said selector contacts and an output terminal adapted to be coupled to a load, the improvement comprising an auxiliary system for effecting arcless engagement and disengagement of said taps by said selector contacts including first and second terminals coupled to the first and second collectors, respectively; a first selector switch for engaging one or the other of said terminals; a current switch coupled between said selector switch and said output terminal; a first thyristor circuit coupled in shunt about said current switch; a gating circuit coupled to said thyristor circuit for energizing said thyristor circuit to allow said current switch to open arclessly; current limiting impedence means; means for electrically coupling said impedance means to one of said first or second terminals and circuit switching means for coupling said impedence means in circuit between said output terminal and said first or said second collectors.

2. The improvement according to claim 1, wherein said means for electrically coupling comprises a second selector switch for engaging one or the other of said terminals and said circuit switching means comprises a second thyristor circuit coupled in series with said current limiting impedence means; and a second gating circuit coupled to said second thyristor circuit for enabling said thyristor circuit when said second selector switch changes position, whereby load current is temporarily conducted through said second selector switch, current limiting impedence and second thyristor circuit while said first selector switch is moved from one of said terminals to the other.

3. The improvement according to claim 2, further including a current transformer coupled to a line in series with said current switch; means for applying the output of said current transformer to said first gating circuit.

4. The improvement according to claim 3, further including an auxiliary winding electromagnetically linked to said tapped winding and coupled in series between one of said collectors and one of said therefore first or second terminals.

5. The improvement according to claim 1, wherein said current limiting impedence comprises a first resistor and a second resistor; said means for electrically coupling comprises a first conductor coupling said first terminal to said first resistor and a second conductor coupling said second terminal to said second resistor; said circuit switching means comprises a second thyristor circuit coupled in series with said second resistor and a third thyristor circuit coupled in series with said first resistor; and a second gating circuit for enabling said first or said second thyristor circuit.

6. The improvement according to claim 5, further including an auxiliary winding magnetically coupled to said tapped winding and coupled in series between one of said collectors and said second current limiting resistor.

* * * * *